United States Patent
Kim et al.

(10) Patent No.: US 8,331,299 B2
(45) Date of Patent: Dec. 11, 2012

(54) METHODS OF TRANSMITTING AND RECEIVING DATA IN MOBILE COMMUNICATION SYSTEM AND DEVICE SUPPORTING THE SAME

(75) Inventors: Jeong Ki Kim, Gyeonggi-do (KR); Yong Ho Kim, Gyeonggi-do (KR); Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 468 days.

(21) Appl. No.: 12/599,283

(22) PCT Filed: May 7, 2008

(86) PCT No.: PCT/KR2008/002565
§ 371 (c)(1),
(2), (4) Date: Nov. 6, 2009

(87) PCT Pub. No.: WO2008/136640
PCT Pub. Date: Nov. 13, 2008

(65) Prior Publication Data
US 2010/0246504 A1    Sep. 30, 2010

(30) Foreign Application Priority Data

May 8, 2007  (KR) ......................... 10-2007-0044534
Feb. 11, 2008  (KR) ......................... 10-2008-0012327

(51) Int. Cl.
*H04W 4/00* (2009.01)
*H04L 3/16* (2006.01)
(52) U.S. Cl. ....................................... 370/329; 370/437
(58) Field of Classification Search ................... 370/329
See application file for complete search history.

(56) References Cited

U.S. PATENT DOCUMENTS

| 7,277,737 | B1 * | 10/2007 | Vollmer et al. | 455/574 |
| 2005/0122936 | A1 * | 6/2005 | Son et al. | 370/331 |
| 2005/0141541 | A1 | 6/2005 | Cuny et al. | |
| 2006/0028986 | A1 * | 2/2006 | Kwon et al. | 370/230 |
| 2006/0030305 | A1 * | 2/2006 | Lee et al. | 455/418 |

(Continued)

FOREIGN PATENT DOCUMENTS

JP    2007-006199    1/2007

(Continued)

OTHER PUBLICATIONS

J. R. Lee,; "Hybrid Power-Saving Mode Considering VoIP Traffic in IEEE 802.16e Systems"; Journal of Korea Multimedia Society, vol. 10, No. 4, pp. 450-461; Apr. 2007.

(Continued)

*Primary Examiner* — Derrick Ferris
*Assistant Examiner* — Gerald Smarth
(74) *Attorney, Agent, or Firm* — Lee, Hong, Degerman, Kang & Waimey

(57) ABSTRACT

A method and apparatus of transmitting and receiving data in a mobile communication system is disclosed. The method of transmitting and receiving data in a mobile communication system comprises receiving control information related to transmission and reception from a transmitting side, determining at least one of power saving parameter information of a talk spurt and a silence period from the control information related to transmission and reception, and receiving data from the transmitting side by applying the power saving parameter information depending on the talk spurt and the silence period. According to the above method, unnecessary data reception is not performed in the silence period.

15 Claims, 15 Drawing Sheets

U.S. PATENT DOCUMENTS

| | | |
|---|---|---|
| 2006/0039313 A1* | 2/2006 | Chou et al. .................... 370/328 |
| 2007/0298836 A1* | 12/2007 | Yanover .................... 455/552.1 |
| 2008/0130676 A1* | 6/2008 | Liu et al. ....................... 370/445 |
| 2009/0059847 A1* | 3/2009 | Baek et al. .................... 370/328 |

FOREIGN PATENT DOCUMENTS

| | | |
|---|---|---|
| KR | 1020040104870 | 12/2004 |
| KR | 1020060112578 | 11/2006 |
| RU | 2144281 | 1/2000 |
| WO | 2006040769 | 4/2006 |
| WO | 2006/132469 | 12/2006 |

OTHER PUBLICATIONS

J. W. So and D. H. Cho; On Effect of Timer Object for Sleep Mode Operation in cdma2000 System; 2000 IEEE International Conference on Communications, vol. 1, pp. 555-559, Apr. 2000.

* cited by examiner

METHODS OF TRANSMITTING AND RECEIVING DATA IN MOBILE COMMUNICATION SYSTEM AND DEVICE SUPPORTING THE SAME

CROSS-REFERENCE TO RELATED APPLICATIONS

This application is the National Stage filing under 35 U.S.C. 371 of international application No. PCT/KR2008/002565, filed on May 7, 2008, which claims the benefit of earlier filing date and right of priority to Korean Application Nos. 10-2007-0044534, filed on May 8, 2007, and 10-2008-0012327, filed on Feb. 11, 2008, the contents of which are hereby incorporated by reference herein in their entirety.

TECHNICAL FIELD

The present invention relates to methods of transmitting and receiving data in mobile communication system and device supporting the same.

BACKGROUND ART

IP based voice traffic (VoIP traffic) is divided into a talk-spurt in which communication is performed between users, and a silence period in which users are listening without talking. The silence period occupies more than 50% in a conventional call session. Accordingly, various types of voice codec are used to allocate different bandwidths to the talk spurt and the silence period. A represent example of the voice codec includes an adaptive multi-rate (AMR) used in a GSM (Global System for Mobile communication) and a UMTS (Universal Mobile Telecommunications System).

Since voice data are not generated in the silence period, if bandwidths are allocated to the silence period, it can cause a waste of resources. To avoid this, VoIP supports a silence suppression scheme. According to the silence suppression scheme, a vocoder which generates VoIP traffic does not generate any traffic during the silence period, and periodically generates comfort noise to report to its opposite user that call continues to be maintained. For example, a vocoder which uses AMR codec generates a packet per 20 ms during the talk spurt, and generates comfort noise per 160 ms during the silence period.

IEEE 802.16e provides an unsolicited grant service (UGS) scheduling scheme to support a real-time uplink service flow which periodically transmits a data packet of a fixed size, such as T1/E1 or VoIP to which a silence suppression scheme is not applied. According to the UGS scheduling scheme, a base station periodically allocates resources (for example, Data Grant Burst IEs) to a mobile station based on a maximum sustained traffic rate, and periodically transmits data of a fixed size to the mobile station by using the allocated resources.

Furthermore, the IEEE 802.16(e) defines a power saving class (PSC) of a sleep mode to reduce power consumption of the mobile station, which occurs due to the UGS scheduling. In PSC2 which is a kind of PSC, sizes of a sleep window and a listening window are fixed. The sleep window has the same concept as a sleep interval, and the listening window has the same concept as a listening interval. FIG. 1 is a diagram illustrating a concept of UGS scheduling and a concept of power saving class 2 (PSC2) applied to the UGS.

As illustrated in the UGS part, the base station periodically allocates resources of a fixed size to the mobile station, and the mobile station transmits data through the allocated zone. As illustrated in the PSC2 part, the PSC is provided with a listening window and a sleep window, which respectively have a fixed size, to correspond to features of traffic, and transmits data from the listening window through the allocated zone.

Meanwhile, the IEEE 802.16(e) provides a new scheduling scheme called an extended real-time polling service (Extended rtPS) for VoIP traffic which supports a silence suppression scheme. FIG. 2a and FIG. 2b are diagrams illustrating a concept of scheduling of extended rtPS and a concept of PSC2 applied to the extended rtPS (ErtPS).

The base station periodically allocates an uplink bandwidth used for data transmission or bandwidth request, and does not change a size of uplink (UL) allocation until it receives a bandwidth change request from the mobile station. When the mobile station requests bandwidth change, if a bandwidth request size is set to 0, the base station allocates unicast BR opportunity only equivalent to a bandwidth request header (BR header) as illustrated in FIG. 2a, or does not allocate any bandwidth as illustrated in FIG. 2b.

Referring to FIG. 2a, when the mobile station intends to transmit user data, the mobile station requests a bandwidth request through the bandwidth for transmission of the bandwidth request header. By contrast, if the base station does not allocate any bandwidth as illustrated in FIG. 2b, since there is no chance to request a bandwidth even in case of the presence of user data to be transmitted, the mobile station uses a contention based bandwidth request opportunity or requests bandwidth allocation through a channel (for example, transmission of CQICH codeword), wherein the channel is used when the mobile station periodically transmits control information, such as channel quality, to the base station regardless of transmission of actual user data. However, in case of both FIG. 2a and FIG. 2b, the mobile station repeats the sleep window and the listening window even in the silence period at the same interval and size as those of the talk spurt.

In other words, if comfort noise periodically occurs in the silence period in the extended rtPS (for example, payload of about 7 byte per 160 ms occurs in the AMR), the mobile station transmits the bandwidth request header to the periodically allocated zone (unicast BR opportunity). If PSC is applied to the VoIP service, the size of the sleep window is determined based on unsolicited grant interval (UGI) regardless of the talk spurt or the silence period. Accordingly, the base station periodically (for example, per 20 ms) allocates a bandwidth to the silence period which periodically (for example, per 160 ms in case of AMR codec) generates comfort noise only without data transmission, and the mobile station identifies whether there is downlink traffic per the determined sleep window (for example, 20 ms), or performs a bandwidth request by using allocated resources when there are data to be transmitted. Actually, since noise occurs in the silence period per longer time (for example, 160 ms in case of AMR) than the sleep window, noise occurring per sleep window (for example, 20 ms) of a fixed size can cause unnecessary power consumption.

DETAILED DESCRIPTION OF THE INVENTION

Technical Problems

An object of the present invention is to provide methods of transmitting and receiving data in a mobile communication system and a device supporting the same, in which power consumption of a mobile station is minimized in a silence period during data transmission and reception of a mobile communication system which supports a silence suppression scheme.

Technical Solutions

Accordingly, the present invention is directed to methods of transmitting and receiving data in a mobile communication system and a device supporting the same, which substantially obviate one or more problems due to limitations and disadvantages of the related art.

To achieve the object and other advantages and in accordance with the purpose of the invention, as embodied and broadly described herein, a method of transmitting and receiving data in a receiving side of a mobile communication system comprises receiving control information related to transmission and reception from a transmitting side, determining at least one of power saving parameter information of a talk spurt and a silence period from the control information related to transmission and reception, and receiving data from the transmitting side by applying the power saving parameter information depending on the talk spurt and the silence period.

Preferably, the method further comprises transmitting conversion request information to the transmitting side and receiving conversion response information during mutual conversion between the talk spurt and the silence period depending on the determined power saving parameter information.

Preferably, the data is received during the talk spurt or the silence period at the same interval or different intervals.

Preferably, the power saving parameter information includes information of a first period for setting data grant interval in the talk spurt and information of a second period for setting polling interval in the silence period.

Preferably, the conversion request information includes or does not include information of a listening interval and a sleep interval with respect to the talk spurt and the silence period depending on determining at least one of the power saving parameter information.

Preferably, the silence period has a data reception interval and a listening interval, which are the same as each other.

Preferably, the power saving parameter information further includes at least one of size information of SID (Silence Description) data transmitted to the transmitting side at the silence period and bandwidth interval information allocated for the SID data to the transmitting side at the silence period.

Preferably, the method further comprises the step of converting between the talk spurt and the silence period.

In another aspect of the present invention, an apparatus for transmitting and receiving data in a receiving side of a mobile communication system comprises a control module negotiating QoS parameters for VoIP service with a base station, defining a power saving class (PSC) for a talk spurt by using the negotiated QoS parameters, activating the defined PSC, redefining a PSC of a silence period by using the negotiated QoS parameters if conversion from the talk spurt to the silence period is made, and activating the redefined PSC.

In other aspect of the present invention, an apparatus for transmitting and receiving data in a receiving side of a mobile communication system comprises a control module comprising negotiating QoS parameters for VoIP service with a base station, defining a first power saving class (PSC-1) for a talk spurt and a second power saving class (PSC-2) for a silence period by using the negotiated QoS parameters, selecting the PSC-1 and activating the selected PSC-1, if conversion from the talk spurt to the silence period is made, and selecting the PSC-2 and activating the selected PSC-2, if conversion from the silence period to the talk spurt is made.

Preferably, in the above aspects, a silence suppression scheme is applied to the VoIP service.

Preferably, the PSC includes a first period for setting a data grant interval for a VoIP service flow in the talk spurt, and includes a second period for setting a polling interval for the VoIP service flow in the silence period. In this case, the second period is set to a value greater than the first period.

Preferably, the PSC includes at least one of maximum sustained traffic rate for each of the talk spurt and the silence period, traffic priority, request/transmission policy, and unsolicited grant interval. In this case, the unsolicited grant interval of the silence period is set to a value greater than that of the talk spurt.

Advantageous Effects

According to the present invention, in a silence period of a data communication service in a mobile communication system which supports a silence suppression scheme, a size of a sleep window of a mobile station becomes identical with a transmission period of comfort noise to prevent power consumption due to repetition of unnecessary sleep/listening from occurring.

BEST MODE FOR CARRYING OUT THE INVENTION

Figure 1:
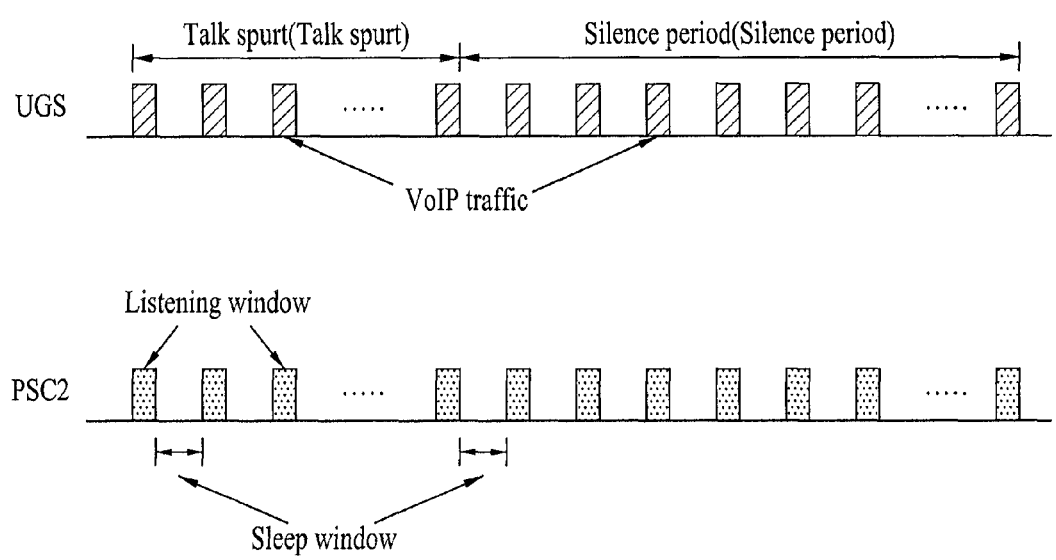
FIG. 1 is a diagram illustrating a concept of UGS scheduling and a concept of power saving class (PSC2) applied to UGS.
Figure 2A:
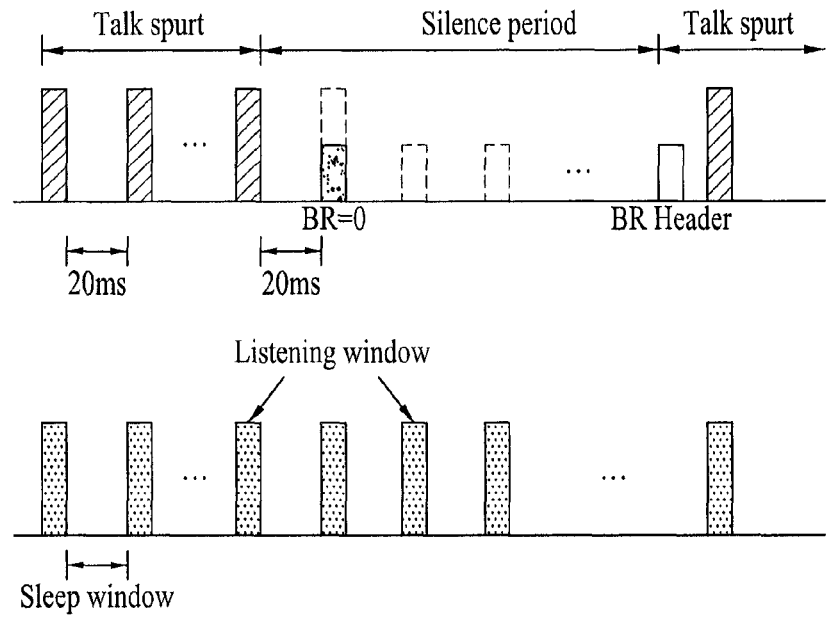
FIG. 2a and FIG. 2b are diagrams illustrating a concept of scheduling of extended rtPS and a concept of PSC2 applied to the extended rtPS (ErtPS)
Figure 2B:
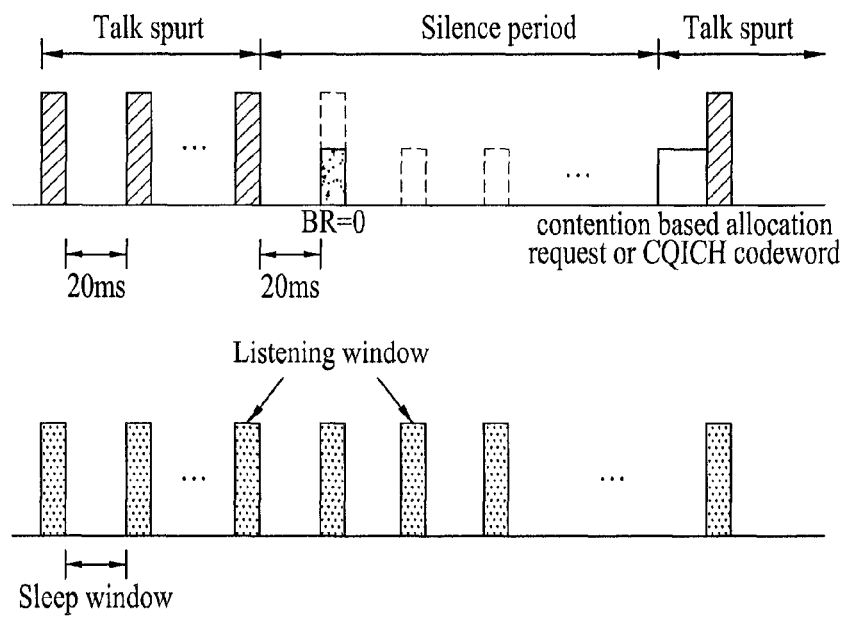

Hereinafter, structures, operations, and other features of the present invention will be understood readily by the preferred embodiments of the present invention, examples of which are illustrated in the accompanying drawings. It is to be understood that the detailed description which will be disclosed along with the accompanying drawings is intended to describe the exemplary embodiments of the present invention, and is not intended to describe a unique embodiment that can be carried out by the present invention. Embodiments which will be described hereinafter are examples to which technical features of the present invention are applied to a fourth generation mobile communication system called IEEE 802.16m, and it will be apparent that the technical features of the present invention can be applied to other similar mobile communication systems such as LTE (Long Term Evolution) of E-UMTS (Evolved Universal Mobile Telecommunications System) and Wibro system. The technology which will be described hereinafter can be used in various communication systems including a system which uses multiple antennas.

Furthermore, the communication system is widely deployed to provide various communication services such voice and packet data. The technology can be used for a downlink or an uplink. The downlink means communication from a base station (BS) to a mobile station (MS), while the uplink means communication from the mobile station and the base station.

The base station generally means a fixed station which communicates with the mobile station, and can be referred to as other terminologies such as node-B, base transceiver system (BTS), and access point. The mobile station may be fixed or may have mobility, and can be referred to as other terminologies such as UE (user equipment), UT (user terminal), SS (subscriber station), and wireless device.

Generally, the communication system includes a transmitter and a receiver. The transmitter and the receiver can be referred to as a transceiver which performs both a transmitting function and a receiving function. However, to clarify description of feedback, a side which serves to transmit general data is referred to as a transmitter and the other side which serves to transmit feedback data to the transmitter is referred to as a receiver.

In the downlink, the transmitter could be a part of the base station, and the receiver could be a part of the mobile station. In the uplink, the transmitter could be a part of the mobile station, and the receiver could be a part of the base station. The base station can includes a plurality of receivers and a plurality of transmitters, and the mobile station can include a plurality of receivers and a plurality of transmitters.

Hereinafter, a broadband wireless access system will be described exemplarily, and it is basically set that a size of a sleep window in a silence period is different from that in a talk spurt to avoid power consumption of the mobile station due to repetition of listening/sleep in the silence period. To this end, various embodiments will be described below.

In the embodiments which will be described hereinafter, to differently set the size of the sleep window per silence/talk period, among QoS (Quality of Service) parameter sets exchanged between the mobile station and the base station when a flow for a voice service is generated, a specific parameter is used to set the size of the sleep window in the silence period. In this case, an example of the voice service includes an extended real-time polling service (ERT-PS) such as VoIP service which supports a silence suppression scheme. Also, any one of the parameter sets according to the related art can be used as the specific parameter of the QoS parameter sets, or a new parameter for implementing the aforementioned set method can be defined. An example of the QoS parameter sets according to the latter case will be expressed as follow.

TABLE 1

| Parameter | Meaning |
| --- | --- |
| Maximum Latency | Maximum latench between entrance of packet to Convergnece Sublayer and forwarding of SDU packet to RF interface |
| Tolerated Jitter | Maximum Jitter for connection. (milliseconds) |
| Minimum Reserved Traffic Rate | Minimum data to be transmitted forservice when average on time is performed. |
| Maximum Sustained Traffic Rate | Peak information rate of service Does not include 802.16 MAC overhead such as MAC header or CRC |
| Traffic Priority | Determine priority in request service and grant generation. 0 to 7 - higher number indicates higher priority. Basic value is 0 |
| Request/Transmission Policy | Capability for defining a specific feature for associated service flow |
| Unsolicited Polling Interval | Maximum nominal period between successive polling grants opportunities for service flow, especially used in a silence period of VoIP traffic which uses a silence suppression scheme. This parameter is used to determine a size of sleep window during a silence period (inactivation state) of VoIP which uses a silence suppression scheme. |
| Unsolicited Grant Interval | Nominal period between successive data grants opportunities for service flow, especially used in a talk spurt of VoIP traffic which uses a silence suppression scheme. This parameter is used to determine a size of sleep window during a talk spurt (activation state) of VoIP which uses a silence suppression scheme. |

In Table 1, the unsolicited polling interval parameter means a maximum nominal interval between successive polling grant opportunities for ERT-PS flow, and is used to determine the size of the sleep window in the silence period as described above. The unsolicited polling interval can be set to correspond to a period (for example, 160 ms in cases of AMR) of noise traffic generated in the silence period. The other parameters (Maximum Sustained Traffic Rate, Traffic Priority, Request/Transmission Policy) used in the silence period can be used as they are defined conventionally.

Since various modifications can be made to a scheme of applying the unsolicited polling interval to the PSC, embodiments according to the various modifications will now be described in detail.

Embodiment 1

This embodiment relates to a case where one PSC is defined for one service flow and the QoS parameter sets of Table 1 are used to define the PSC.

Figure 3:
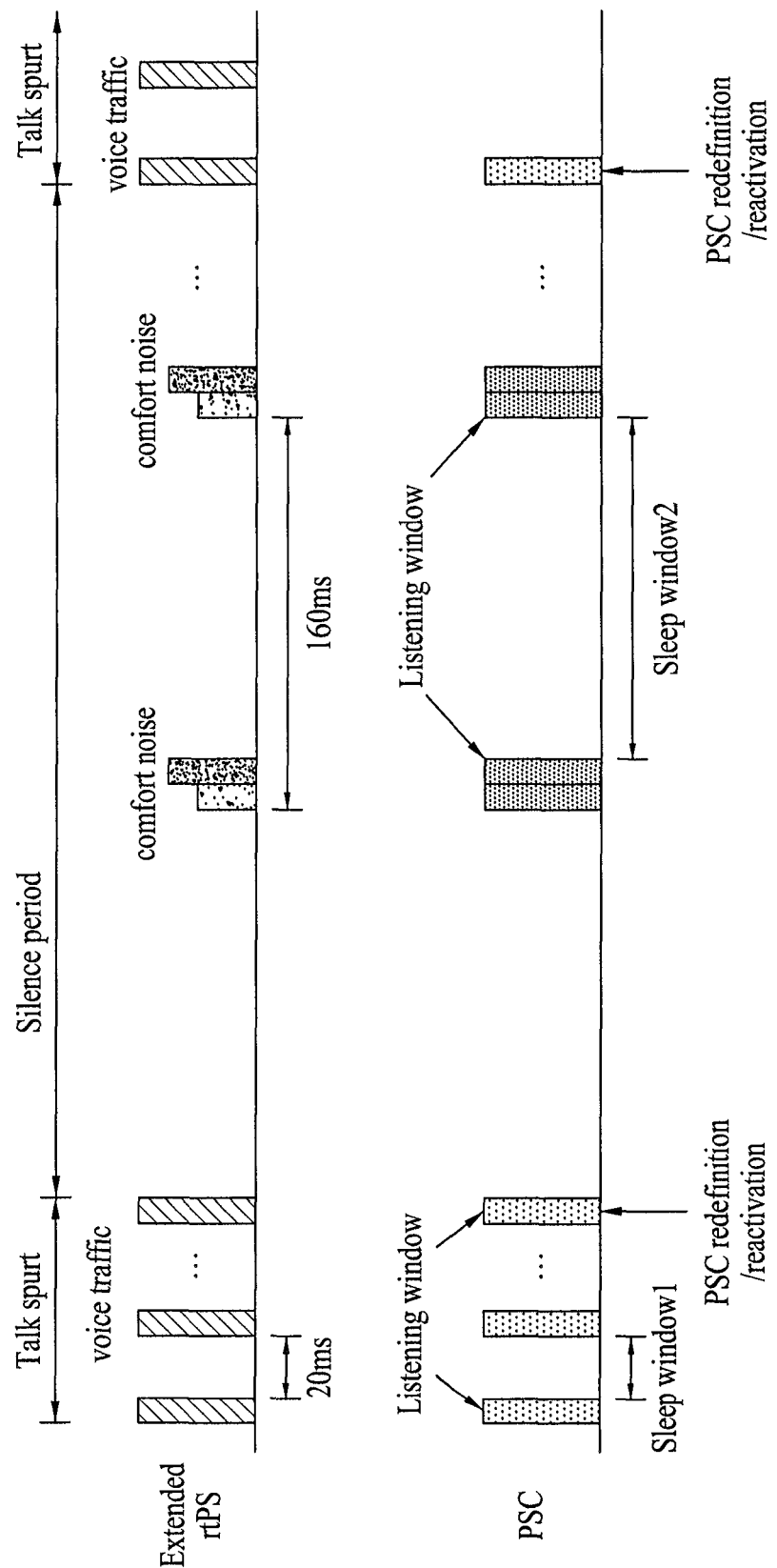
FIG. 3 is a diagram illustrating a concept of scheduling of ErtPS and a concept of PSC2 applied to the ErtPS in accordance with the embodiment 1.

FIG. 3 is a diagram illustrating a concept of scheduling of ErtPS and a concept of PSC2 applied to the ErtPS in accordance with the embodiment 1. In this case, ErtPS is only an example, and the PSC2 is equally applied to a real-time packet transmission service such as (ErtVR) extended real-time variable rate service, to which the silence suppression scheme is applied. This is equally applied to the embodiments which will be described later.

In this embodiment, one PSC is defined for one service flow, and a specific PSC parameter is changed to redefine PSC whenever conversion between the talk spurt and the silence period is made. An example of PSC parameter to be changed in accordance with the conversion includes a size of a listening window and/or a sleep window.

As illustrated in FIG. 3, a first resource for transmission of voice traffic is allocated to ErtPS of the talk spurt at an interval of 20 ms in accordance with the unsolicited grant interval of Table 1, and a listening window is deployed for the PSC at the same interval as above. Since a deployment interval of the listening window is the same as the size of the sleep window, the size of the sleep window becomes 20 ms.

A second resource for transmission of BR header and comfort noise is allocated to the silence period in accordance with the unsolicited polling interval of Table 1. Since it is sufficient that just only comfort noise is transmitted sometimes in the silence period to maintain communication, it is preferably set that an allocation interval of the second resource is greater than that of the first resource. In FIG. 3, the allocation interval of the second resource is set to 160 ms.

At this time, in the PSC, the size of the listening window is deployed based on the size (in the example, equally) of the resource allocated for transmission of the BR header and comfort noise, and the size of the sleep window is deployed based on the allocation interval (in the example, equally) of the second resource. Accordingly, even though the BR header and the comfort noise are intermittently transmitted in the silence period, the listening/sleep windows are deployed at the same pattern as that of the talk spurt, whereby the mobile station can be prevented from being repeatedly activated/inactivated unnecessarily.

Figure 4:
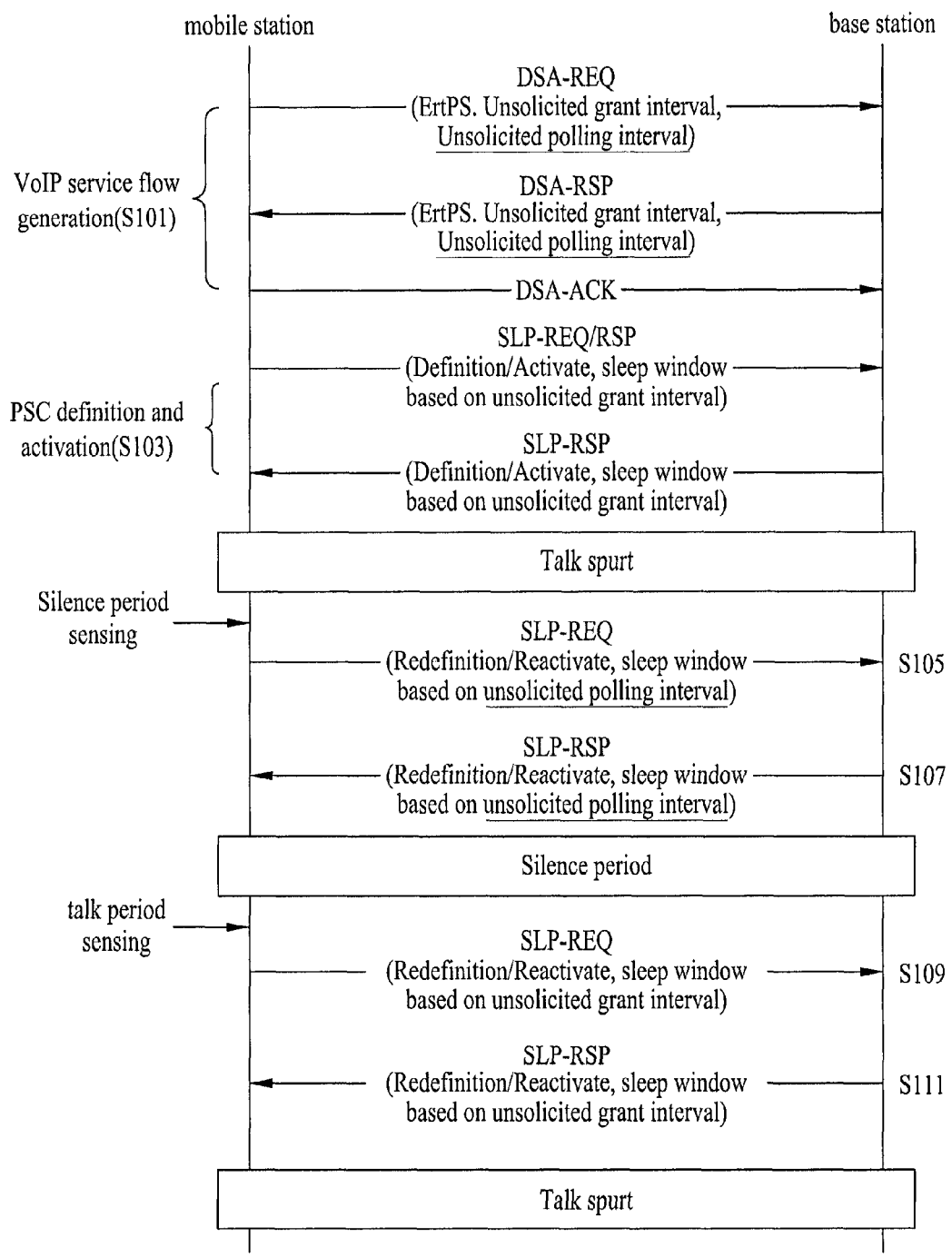
FIG. 4 is a flow chart illustrating a procedure of receiving a VoIP service using PSC of the embodiment 1.

A procedure of receiving VoIP service using the PSC of this embodiment will be described with reference to FIG. 4.

The mobile station negotiates QoS parameters for VoIP service with the base station by exchanging DSA-REQ and DSA-RSP messages (S101). A service flow is generated in the real-time packet service such as VoIP by a dynamic service addition (DSA). In other words, in case of an application service such as VoIP, a transmitting side transmits DSA REQ (Request) which are MAC management messages of MAC layer and a receiving side which has received the DSA REQ transmits DSA-RSP (Response) in response to the DSA REQ. If the mobile station needs to generate a service flow such as VoIP service, the mobile station and the base station perform a service flow generation procedure using the DSA-REQ and the DSA-RSP which are MAC management messages (S403). Also, the mobile station and the base station define PSC using the unsolicited grant interval of the QoS parameters negotiated through the above procedure and activates the defined PSC (S103). Since the unsolicited grant interval is set to 20 ms according to the example of FIG. 3, the sleep window of the PSC is defined at 20 ms.

If conversion from the talk spurt to the silence period is sensed, the mobile station defines a proper PSC for the silence period and transmits SLP-REQ (Sleep Request) to the base station to activate the PSC, wherein the SLP-REQ includes the size of the sleep window (S105). At this time, the size of the sleep window is defined based on the unsolicited polling interval of the QoS parameters. According to the example of FIG. 3, since the unsolicited polling period is set to 160 ms, the sleep window is redefined at 160 ms.

If the SLP-REQ is received from the mobile station, the base station determines the state of the service flow as the silence period, and reactivates the PSC of the service at a designated time after transmitting SLP-RSP (Sleep Response) in response to the SLP-REQ (S107).

Subsequently, the base station periodically allocates a bandwidth for transmission of the bandwidth request header (BR header) to the mobile station by using the unsolicited polling interval of the QoS parameters, and the mobile station operates the PSC through the sleep window and the listening window.

If conversion from the silence period to the talk spurt is sensed by the mobile station, the mobile station transmits the size of the sleep window defined based on the unsolicited grant interval to the base station and requests PSC redefinition and reactivation. At this time, the redefined size of the sleep window is transmitted to the base station through the SLP-REQ (S109).

The base station which has received the SLP-REQ determines the current state as the talk spurt and transmits the SLP-RSP to the mobile station (S111). And, the base station allocates a bandwidth based on the unsolicited grant interval. If conversion between the talk spurt and the silence period is sensed by the base station, the base station can transmit the SLP-RSP to the mobile station to report the fact of the conversion. In this case, the mobile station and the base station apply the power saving scheme suitable for each state by using the parameter designated for the SLP-RSP.

Embodiment 2

This embodiment relates to a case where PSC (PSC-1) for the talk spurt and PSC (PSC-2) for the silence period are separately defined for one VoIP service flow, and the QoS parameter sets of Table 1 are used to define each PSC.

Figure 5:
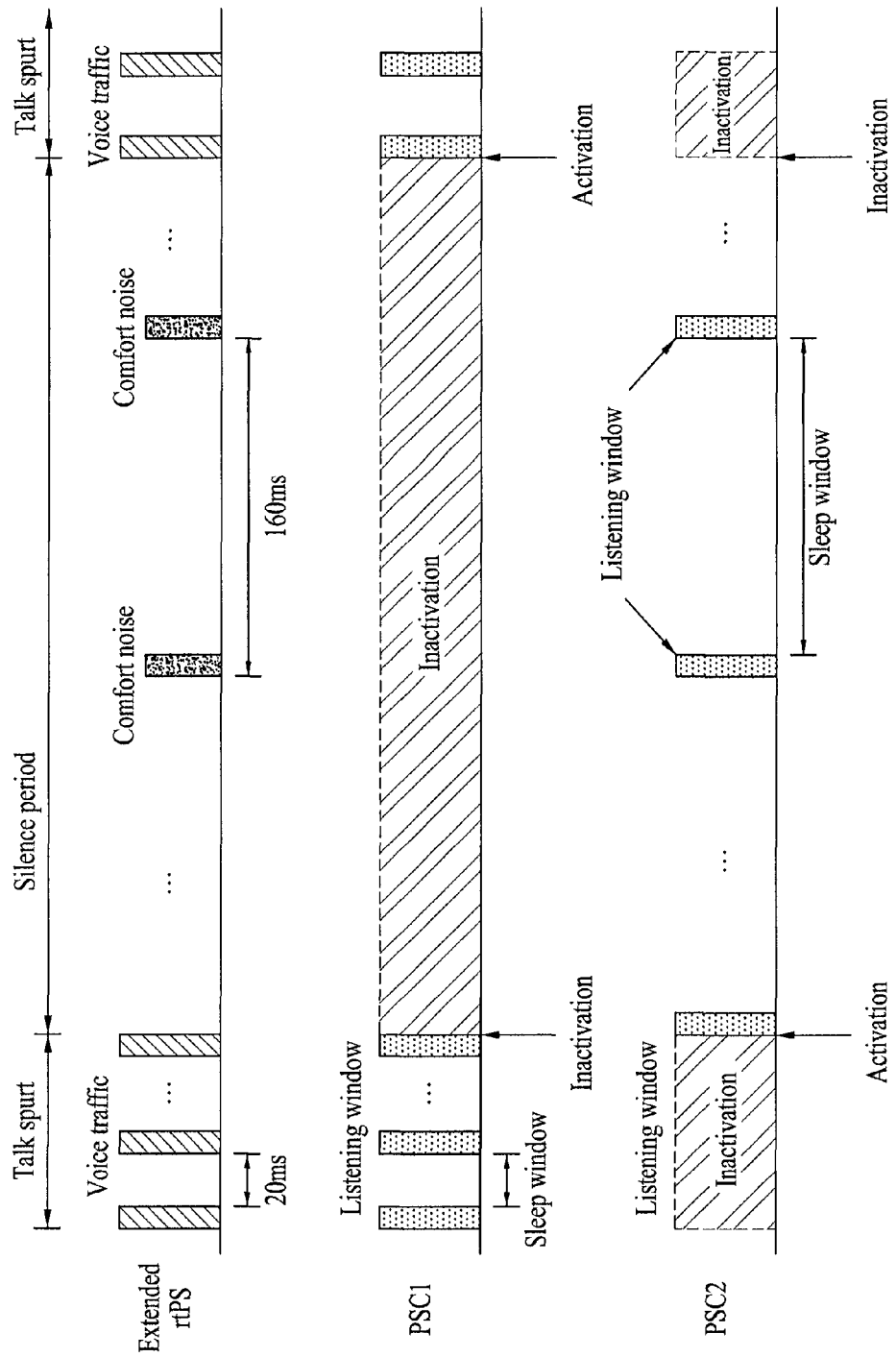
FIG. 5 is a diagram illustrating a concept of scheduling of ErtPS and a concept of PSC2 applied to the ErtPS in accordance with the embodiment 2.

FIG. 5 is a diagram illustrating a concept of scheduling of ErtPS and a concept of PSC-1 and PSC-2 applied to the ErtPS in accordance with the embodiment 2.

As illustrated in FIG. 5, the PSC-1 having the sleep window of 20 ms is defined for the talk spurt, and the PSC-2 having the sleep window of 160 ms is defined for the silence period. In this case, the sleep window of the talk spurt is defined with reference to the unsolicited grant interval of Table 1, and the sleep window of the silence period is defined with reference to the unsolicited polling interval of Table 1. Accordingly, PSC is not newly redefined whenever conversion between the talk spurt and the silence period is made, but the PSC-1 and the PSC-2 previously defined for the corresponding period are alternately used.

Figure 6:
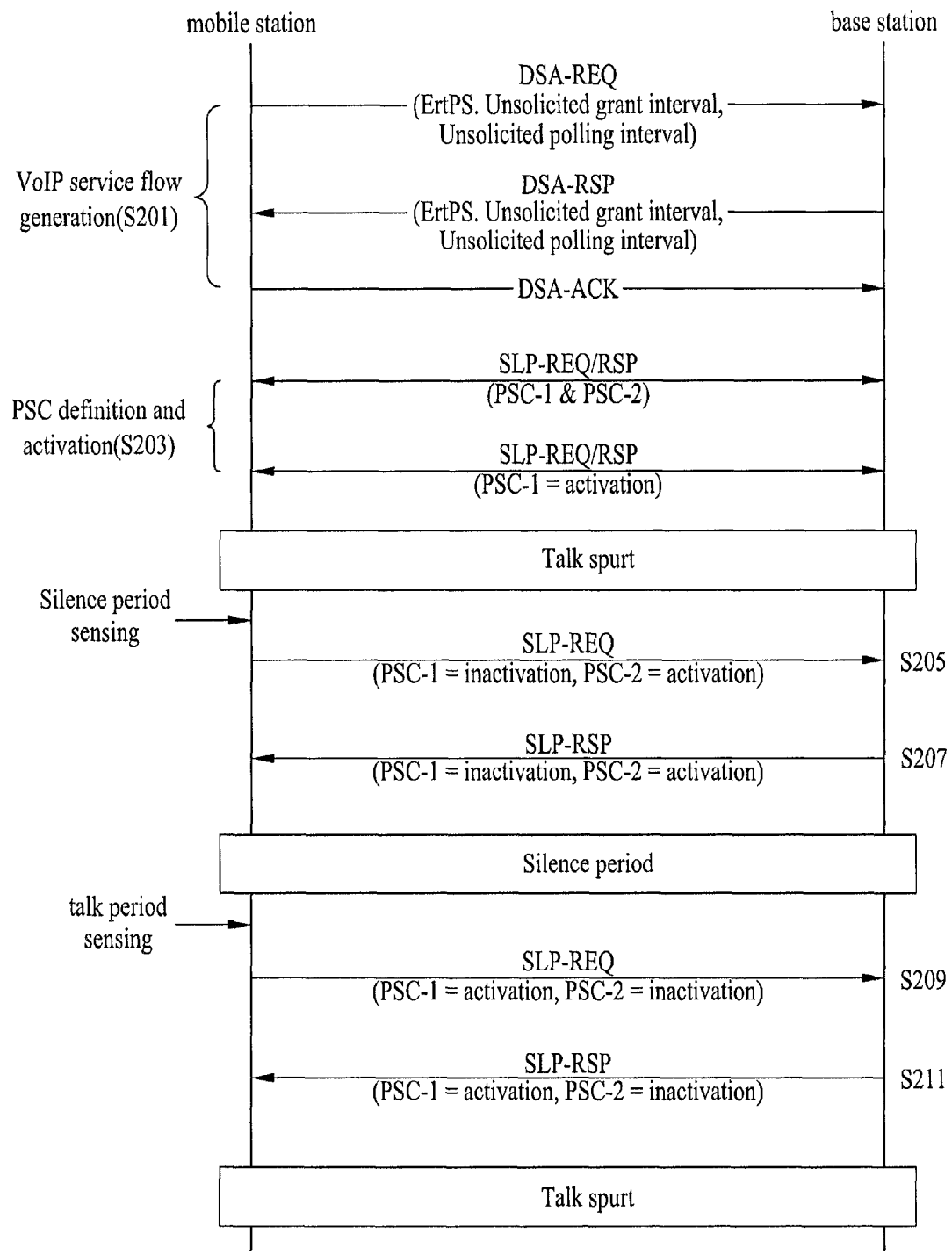
FIG. 6 is a flow chart illustrating a procedure of receiving a VoIP service using PSC of the embodiment 2.

A procedure of receiving VoIP service using the PSC of this embodiment will be described with reference to FIG. 6.

After the VoIP service flow is generated, the mobile station and the base station negotiate QoS parameters required for the VoIP service by exchanging DSA-REQ and DSA-RSP with each other and respectively generate the VoIP service flow (S201).

The mobile station and the base station respectively define the PSC-1 for the talk spurt and the PSC-2 for the silence period by using the unsolicited grant interval and the unsolicited polling interval among the QoS parameters defined in the above negotiation procedure (S201) through SLP-REQ and SLP-RSP, and then activate the PSC-1 as talk is initiated (S203).

If conversion from the talk spurt to the silence period is sensed by the mobile station, the mobile station transmits SLP-REQ to the base station to request the base station to activate the PSC-2 and inactivate the PSC-1 (S205). If the SLP-REQ is received from the mobile station, the base station determines the state of the service flow as the silence period, and transmits SLP-RSP to the mobile station in response to the SLP-REQ after activating the PSC-2 in accordance with the request (S207). Subsequently, the base station periodically allocates a bandwidth in accordance with the unsolicited polling interval so that the mobile station can transmit a bandwidth request header (BR header), and the mobile station which has received the SLP-RSP activates the PSC-2 and inactivates the PSC-1.

In this case, instead of the SLP-REQ, another channel such as a bandwidth request and uplink sleep control header (BR and UL Sleep control header) can be used, and a downlink sleep control extended subheader can be used in response to this channel.

If conversion from the silence period to the talk spurt is sensed by the mobile station, the mobile station transmits the SLP-REQ to the base station to request the base station to activate the PSC-1 and inactivate the PSC-2 (S209). The base station which has received the SLP-REQ determines the current state as the talk spurt, activates the PSC-1, and transmits the SLP-RSP to the mobile station in response to the request. Also, the base station periodically allocates a bandwidth to the mobile station based on the unsolicited grant interval.

Meanwhile, if conversion between the talk spurt and the silence period is sensed by the base station, the base station can transmit unsolicited SLP-RSP or downlink sleep control extended subheader to the mobile station to report the conversion of the state.

The embodiments for performing the VoIP service using the QoS parameter sets in which the unsolicited polling interval of the silence period is additionally defined have been described as above. Hereinafter, the embodiments for performing the VoIP service using QoS parameter sets in which parameters of the talk spurt and parameters of the silence period are separately defined will be described.

Table 2 illustrates an example of the QoS parameter sets of the latter case.

TABLE 2

| Parameter | Meaning |
| --- | --- |
| Maximum Latency | Maximum latency between packet entrance to Convergence Sublayer and forwarding of SDU packet to RF radio interface |
| Tolerated Jitter | Maximum latency Jitter for connection. Milliseconds |
| Minimum Reserved Traffic Rate | Minimum data to be transmitted for service when average is performed on time |
| Maximum Sustained Traffic Rate | Peak information rate of service. Does not include 802.16 MAC overhead such as MAC header or CRC |
| Traffic Priority | Determine priority in request service and grant generation. 0 to 7 - higher number indicates higher priority. Basic value is 0 |
| Request/Transmission Policy | Capability for defining a specific feature for associated service flow |
| Unsolicited Grant Interval | Nominal period between successive data grants opportunities for the service flow, especially used in a talk spurt of VoIP traffic which uses a silence suppression scheme. This parameter is used to determine a size of sleep window during a talk spurt (activation state) of VoIP which uses a silence suppression scheme. |
| SILENCE Maximum Sustained Traffic Rate | Peak information rate of service. Does not include 802.16 MAC overhead such as MAC header or CRC. This parameter is used within a silence period.. |
| SILENCE Traffic Priority | Determine priority in request service and grant Generation. 0 to 7 - higher number indicates higher priority. Basic value is 0. This parameter is used within a silence period. |
| SILENCE Request/Transmission Policy | Capability for defining specific features for the associated service flow |
| SILENCE Unslicited Grant Interval | Nominal period between successive data grants opportunities for service flow, especially used in a silence period of VoIP traffic which uses a silence suppression scheme. This parameter is used |

TABLE 2-continued

| Parameter | Meaning |
|---|---|
| | to determine a size of sleep window during a silence period (inactivation state) of VoIP traffic which uses a silence suppression scheme. |

As illustrated in Table 2, Maximum Sustained Traffic Rate, Traffic Priority, Request/Transmission Policy, and unsolicited grant interval are separately defined for the talk spurt and the silence period. If the silence period is sensed by the base station, the base station allocates a bandwidth suitable for the size of SILENCE Maximum Sustained Traffic Rate for the silence period to the base station per SILENCE Unsolicited Grant Interval. A procedure of performing the VoIP service using the QoS parameters of Table 2 will be described for each embodiment.

Embodiment 3

This embodiment relates to a case where one PSC is defined for one service flow and the QoS parameter sets of Table 2 are used to define the PSC.

Figure 7:
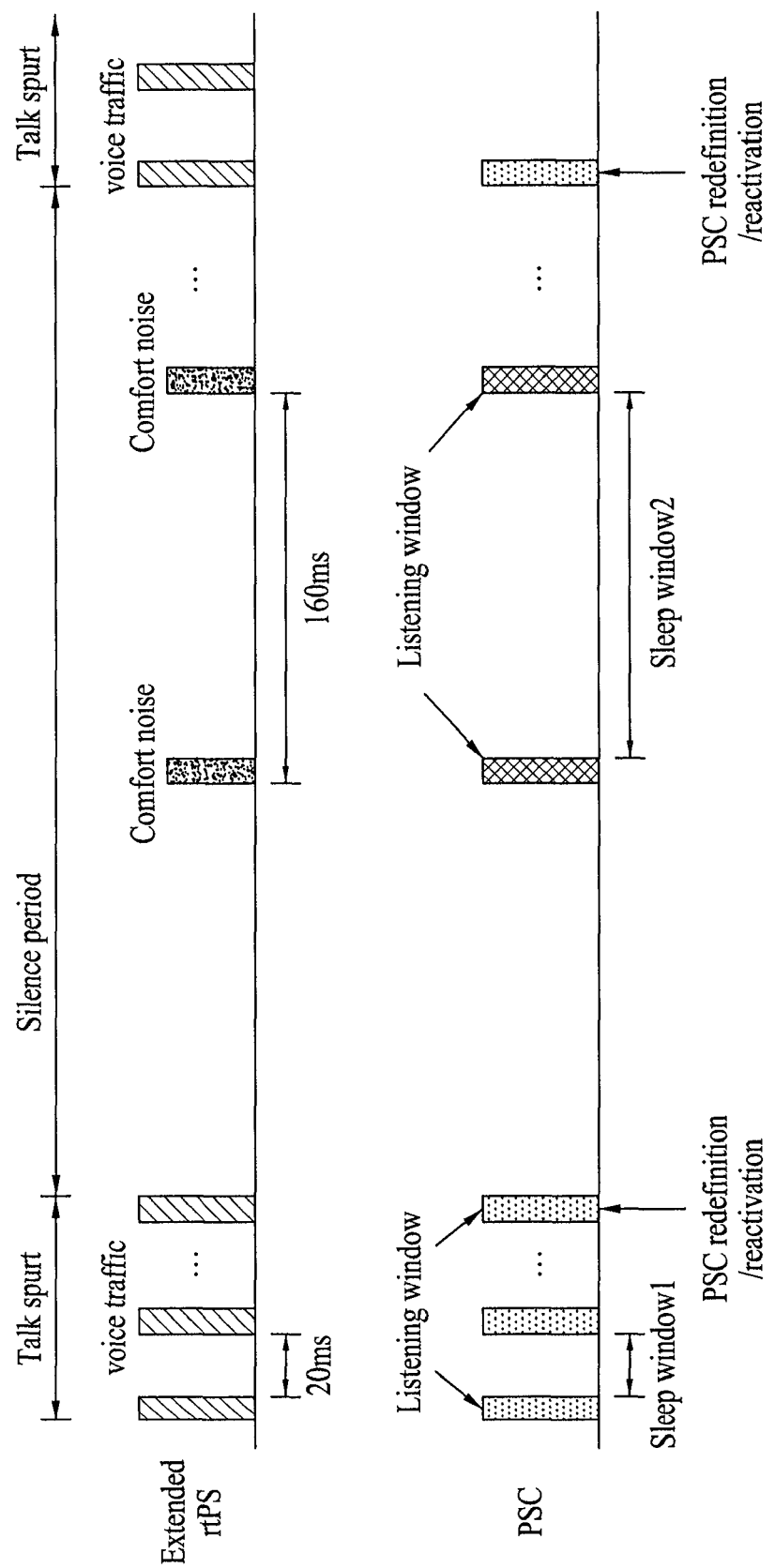
FIG. 7 is a diagram illustrating a concept of scheduling of ErtPS and a concept of PSC2 applied to the ErtPS in accordance with the embodiment 3.

FIG. 7 is a diagram illustrating a concept of scheduling of ErtPS and a concept of PSC2 applied to the ErtPS in accordance with the embodiment 3.

As illustrated in FIG. 7, a first resource for transmission of voice traffic is allocated to ErtPS of the talk spurt at an interval of 20 ms in accordance with the unsolicited grant interval of Table 2, and a listening window is deployed for the PSC at the same interval as above. Accordingly, the size of the sleep window becomes 20 ms.

A second resource for transmission of comfort noise is allocated to the silence period in accordance with the unsolicited polling interval of Table 1. Since it is sufficient to transmit just only comfort noise in the silence period to maintain communication, if the first resource is allocated at an interval of 20 ms, it is preferable that an allocation interval of the second resource is set to 160 ms greater than that of the first resource. Meanwhile, in the PSC, the listening window is deployed at the same size as that of the resource allocated for transmission of the BR header and comfort noise, and the size of the sleep window is deployed based on the allocation interval (in the example, equally) of the second resource.

Figure 8:
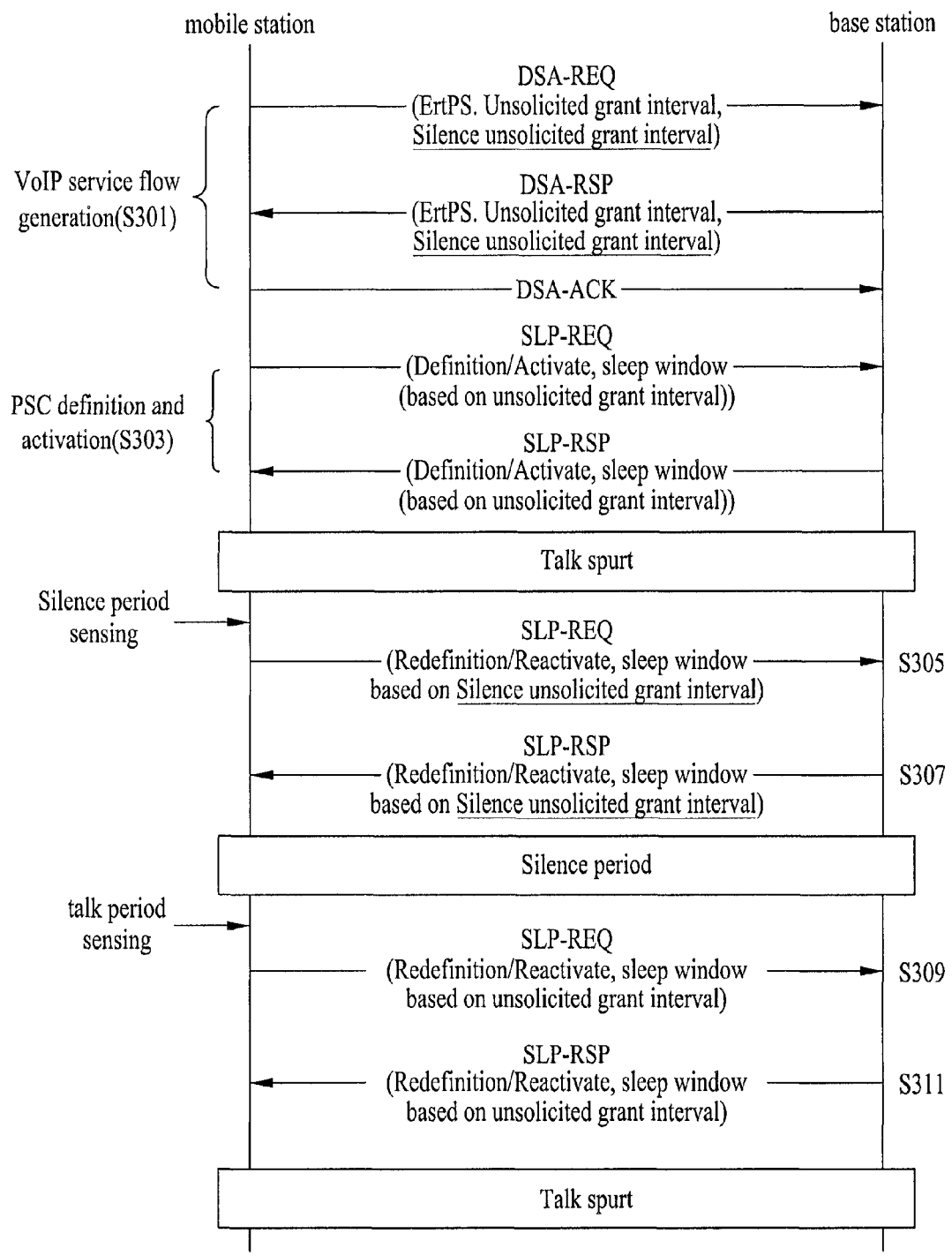
FIG. 8 is a flow chart illustrating a procedure of receiving a VoIP service using PSC of the embodiment 3.

A procedure of receiving VoIP service using the PSC of this embodiment will be described with reference to FIG. 8.

The mobile station negotiates QoS parameters for VoIP service with the base station by exchanging DSA-REQ and DSA-RSP messages (S301). Also, the mobile station defines the PSC using the unsolicited grant interval of the negotiated QoS parameters and activates the defined PSC (S303). Since the unsolicited grant interval is set to 20 ms according to the example of FIG. 8, the sleep window of the PSC is defined at 20 ms.

If conversion from the talk spurt to the silence period is sensed by the mobile station, the mobile station defines a proper PSC for the silence period and transmits SLP-REQ to the base station to activate the PSC, wherein the SLP-REQ includes the size of the sleep window (S305). At this time, the size of the sleep window is defined based on the silence unsolicited grant interval of the QoS parameters. According to the example of FIG. 8, since the silence unsolicited grant period is set to 160 ms, the sleep window of the PSC is redefined at 160 ms.

If the SLP-REQ is received from the mobile station, the base station determines the state of the service flow as the silence period, and reactivates the PSC of the service at a designated time after transmitting SLP-RSP in response to the SLP-REQ (S307).

Subsequently, the base station periodically allocates a bandwidth for transmission of comfort noise to the mobile station by using the silence unsolicited grant interval of the QoS parameters, and the mobile station operates the PSC through the sleep window and the listening window, which are set.

If conversion from the silence period to the talk spurt is sensed by the mobile station, the mobile station transmits the size of the sleep window defined based on the unsolicited grant interval to the base station and requests PSC redefinition and reactivation. At this time, the redefined size of the sleep window is transmitted to the base station through the SLP-REQ (S309).

The base station which has received the SLP-REQ determines the current state as the talk spurt and transmits the SLP-RSP to the mobile station (S311). And, the base station allocates a bandwidth based on the unsolicited grant interval. If conversion between the talk spurt and the silence period is sensed by the base station, the base station can transmit the SLP-RSP to the mobile station to report the fact of the conversion. In this case, the mobile station and the base station apply the power saving scheme suitable for each state by using the parameter designated for the SLP-RSP.

Embodiment 4

This embodiment relates to a case where PSC (PSC-1) for the talk spurt and PSC (PSC-2) for the silence period are separately defined for one VoIP service flow, and the QoS parameter sets of Table 2 are used to define each PSC.

Figure 9:
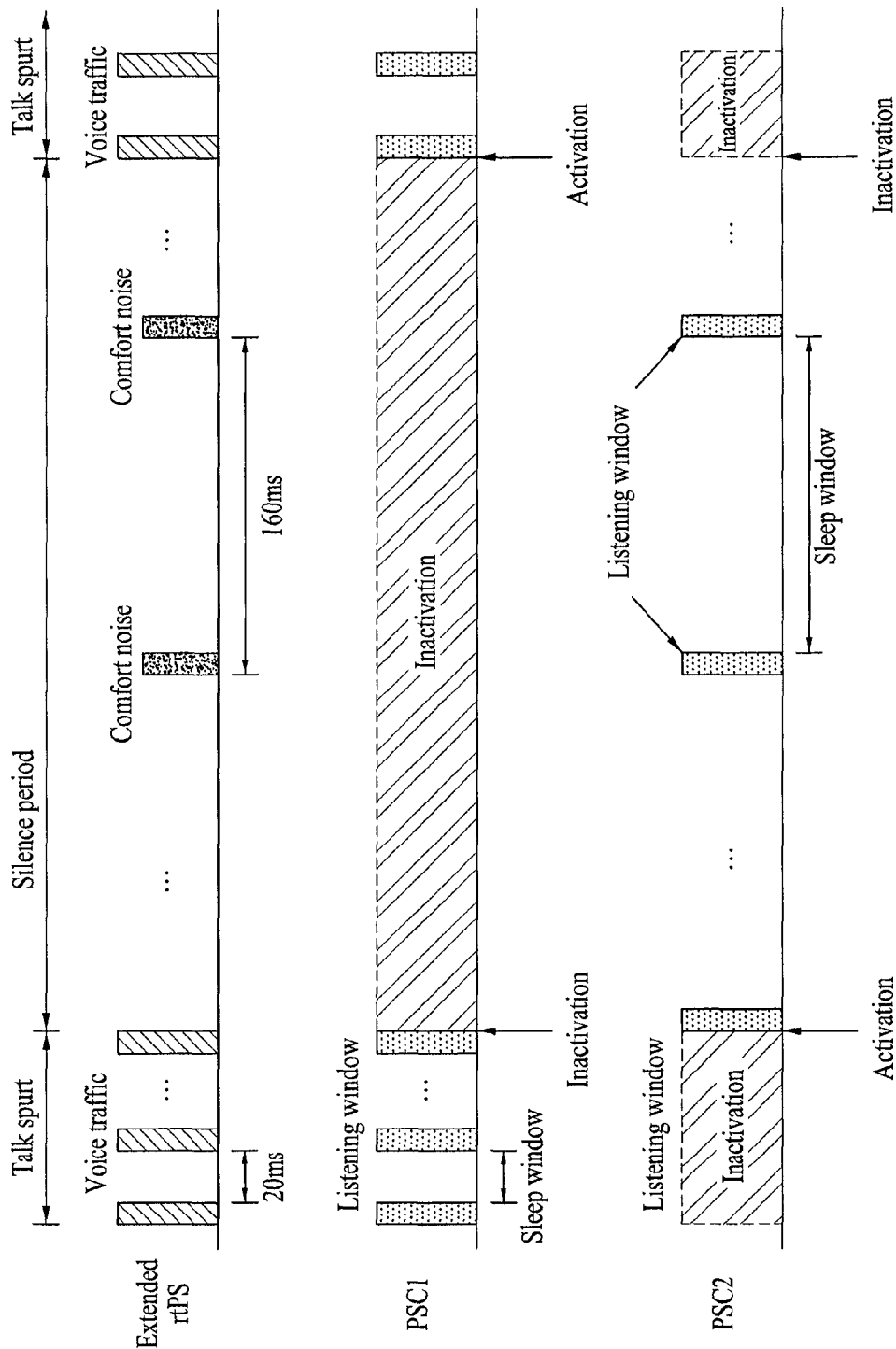
FIG. 9 is a diagram illustrating a concept of scheduling of ErtPS and a concept of PSC2 applied to the ErtPS in accordance with the embodiment 4.

FIG. 9 is a diagram illustrating a concept of scheduling of ErtPS and a concept of PSC-1 and PSC-2 applied to the ErtPS in accordance with the embodiment 4.

As illustrated in FIG. 9, the PSC-1 having the sleep window of 20 ms is defined for the talk spurt, and the PSC-2 having the sleep window of 160 ms is defined for the silence period. In this case, the sleep window of the talk spurt is defined with reference to the unsolicited grant interval of the Table 2, and the sleep window of the silence period is defined with reference to the silence unsolicited grant interval of the Table 2. Accordingly, PSC is not newly redefined whenever conversion between the talk spurt and the silence period is made, but the PSC-1 and the PSC-2 previously defined for the corresponding period are alternately used.

Figure 10:
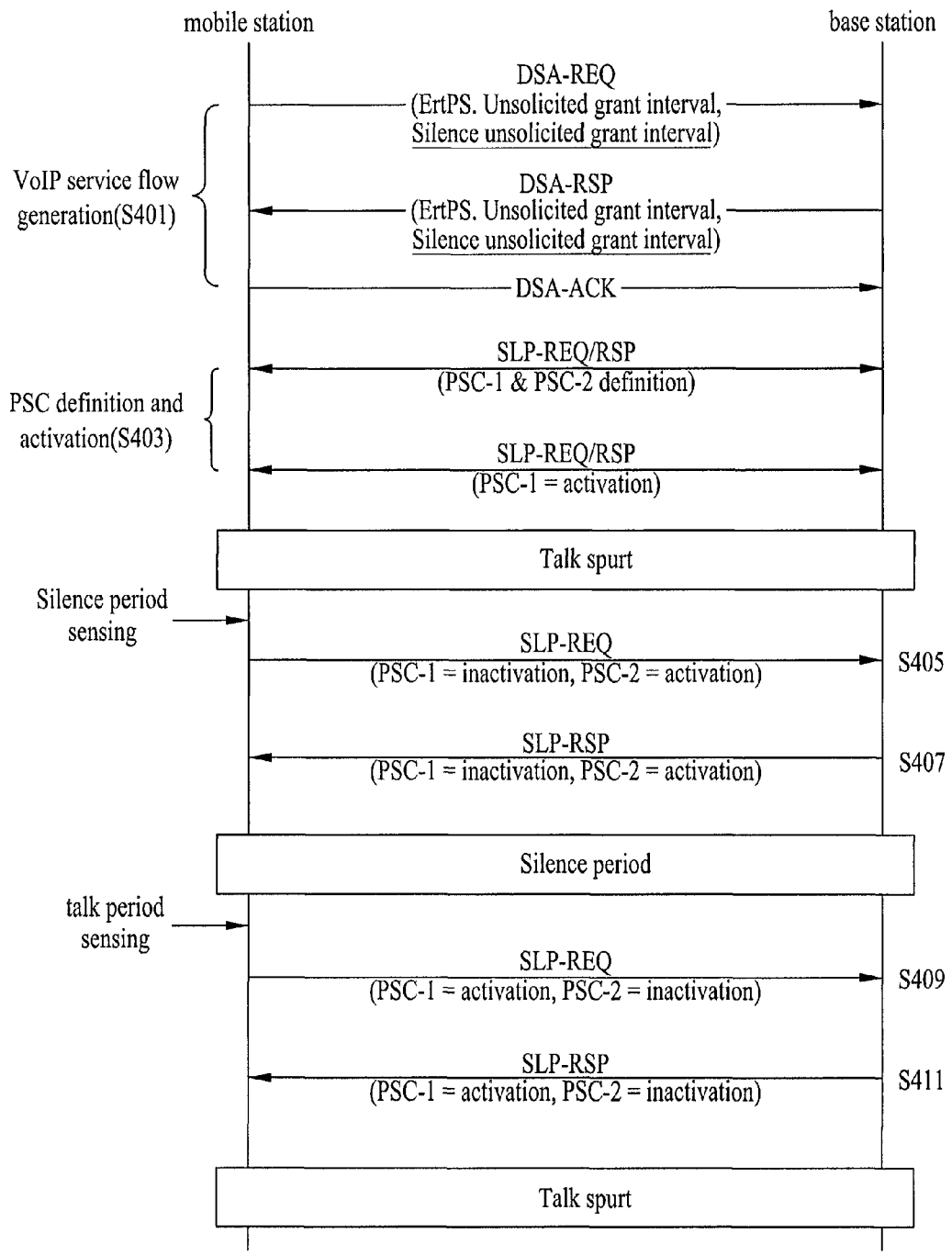
FIG. 10 is a flow chart illustrating a procedure of receiving a VoIP service using PSC of the embodiment 4.

A procedure of receiving VoIP service using the PSC of this embodiment will be described with reference to FIG. 10.

After the VoIP service flow is generated, the mobile station and the base station negotiate QoS parameters required for the VoIP service by exchanging DSA-REQ and DSA-RSP with each other and respectively generate the VoIP service flow (S401).

The mobile station and the base station respectively define the PSC-1 for the talk spurt and the PSC-2 for the silence period by using the unsolicited grant interval and the silence unsolicited grant interval among the QoS parameters defined in the above negotiation procedure (S401) through the SLP-REQ and the SLP-RSP, and then activate the PSC-1 as talk is initiated (S403).

If conversion from the talk spurt to the silence period is sensed by the mobile station, the mobile station transmits SLP-REQ to the base station to request the base station to activate the PSC-2 and inactivate the PSC-1 (S405). If the SLP-REQ is received from the mobile station, the base station determines the state of the service flow as the silence period, and transmits the SLP-RSP to the mobile station in response to the SLP-REQ after activating the PSC-2 in accordance with the request (S407). Subsequently, the base station periodically allocates a bandwidth for transmission of comfort noise to the mobile station by using the silence unsolicited grant interval, and the mobile station which has received the SLP-RSP activates the PSC-2 and inactivates the PSC-1. In this case, instead of the SLP-REQ, another channel such as a bandwidth request and uplink sleep control header (BR and UL Sleep control header) can be used, and a downlink sleep control extended subheader can be used in response to this channel.

If conversion from the silence period to the talk spurt is sensed by the mobile station, the mobile station transmits the SLP-REQ to the base station to request the base station to activate the PSC-1 and inactivate the PSC-2 (S409). The base station which has received the SLP-REQ determines the current state as the talk spurt, activates the PSC-1, and transmits the SLP-RSP to the mobile station in response to the request. Also, the base station periodically allocates a bandwidth to the mobile station based on the unsolicited grant interval.

In the aforementioned embodiments 1 to 4, the mobile station includes a counter and/or a timer to sense conversion between the talk spurt and the silence period.

In other words, in the talk spurt, the mobile station sets the counter to an initial value which is previously defined, checks the presence of traffic per unsolicited grant interval, and decreases the counter by 1 if there does not exist traffic. If the counter is decreased to 0, the mobile station determines the current state as the silence period. Since the counter should be reset per unsolicited grant interval even in the silence period, it is preferably used in the talk spurt.

Furthermore, the mobile station sets the timer to an initial value which is previously defined, checks the presence of traffic per unsolicited grant interval, and determines the current state as the silence period if traffic is not arrived within a given time. Since the timer does not need to be reset in the silence period unlike the counter, it can preferably be used in the silence period.

The mobile station can simultaneously include the counter and the timer, sense conversion from the silence period to the talk spurt by using the counter, and sense conversion from the talk spurt to the silence period by using the timer.

Next, a method of performing mutual conversion between the talk spurt and the silence period through control information acquired in a procedure of exchanging initial QoS parameter without using the counter or the timer and a method of performing interval mutual conversion through a separate conversion command will be described.

The embodiments which will be described later are those which perform the VoIP service using the QoS parameter sets of Table 2, which have additional parameter for the silence period.

The embodiments which will be described later relate to a procedure of performing the VoIP service by adding a new QoS parameter of Table 3 to both cases of defining one PSC in the talk spurt and the silence period for one service flow or defining different PSCs per each of the talk spurt and the silence period. In the embodiments which will be described later, since a function for saving the power in a receiving side by conforming a receiving period of comfort noise (hereinafter, referred to as SID packet data) to the listening interval in the silence interval is the same as that described in the embodiment 1 to the embodiment 4, its description will be omitted. The embodiments which will be described later suggest other new QoS parameters according to the present invention and a method of suppressing silence using the new QoS parameters. The QoS parameters suggested for the embodiments which will be described later are as follows.

TABLE 3

| Parameter | Meaning |
| --- | --- |
| UGIs | Length of UGI(Unsolicited Grant Interval) in silence interval |
| SID_Len | Size of SID(Silence Description) packet |

The mobile station negotiates the QoS parameters with the base station by exchanging the DSA-REQ and the DSA-RSP messages, wherein the QoS parameters include the parameters of Table 2 and Table 3 for real-time packet service such as VoIP. UGIs represents an interval of a bandwidth allocated from the base station to the mobile station in the silence period. SID (Silence Description) packet data is comfort noise transmitted from the mobile station to the base station in the silence period, and its size, etc. may be changed depending on the following embodiments. The base station can periodically allocate a bandwidth to the mobile station by applying the parameters set in Table 3 when the size of the bandwidth requested from the mobile station is 0. Alternatively, the base station allocates a bandwidth having a size requested from the mobile station to the mobile station per UGIs when being requested from the mobile station a bandwidth equal to or smaller than the size of the SID packet with respect to connection of real-time packet service such as VoIP. The mobile station transmits SID packet data using the resource allocated from the base station.

Figure 11:
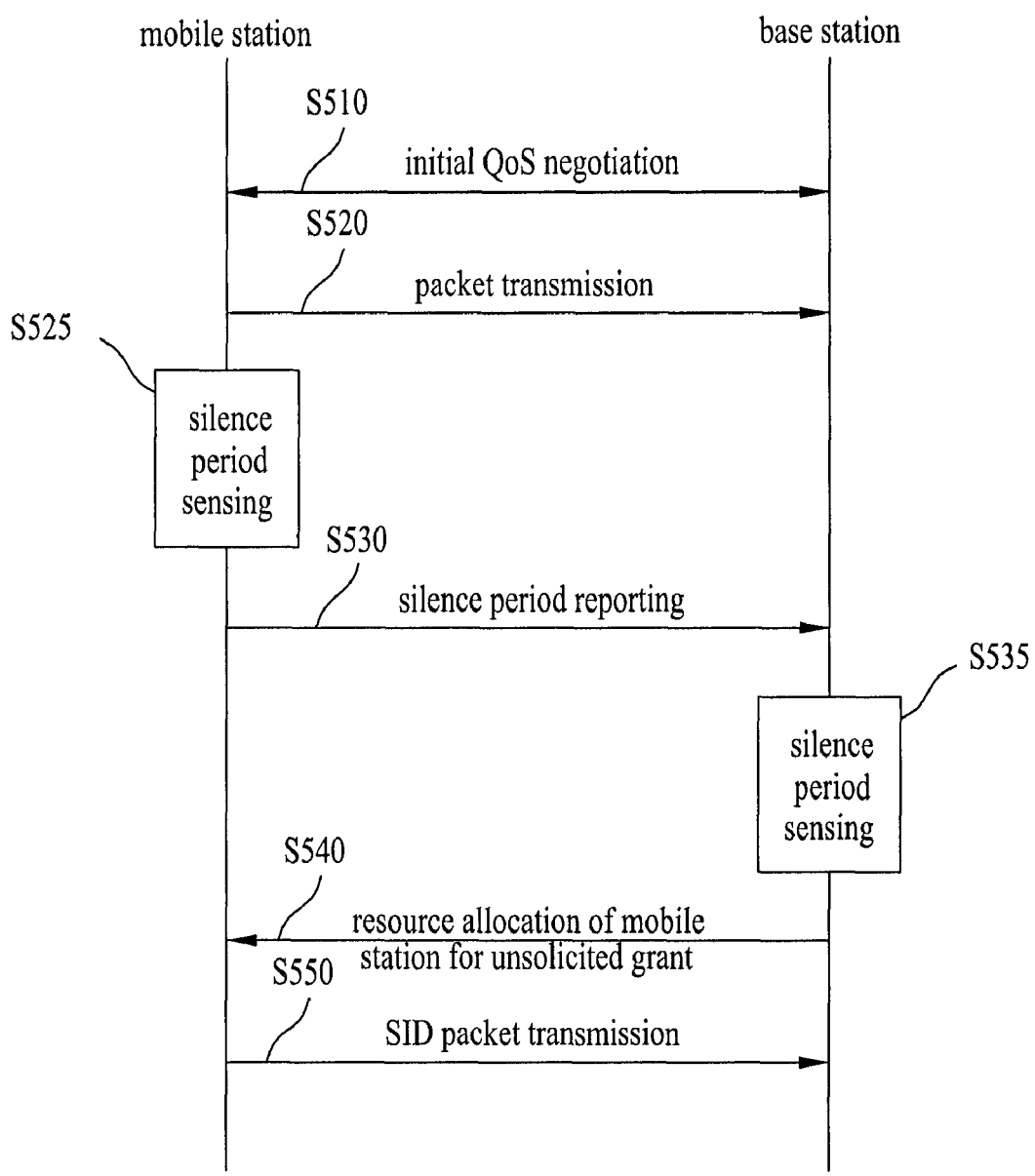
FIG. 11 is a diagram illustrating a connection procedure between a mobile station and a base station, which use QoS parameter suggested in other embodiments of the present invention.

FIG. 11 is a diagram illustrating a connection procedure between the mobile station and the base station, which use the QoS parameters suggested in other embodiments of the present invention.

The mobile station negotiates initial QoS parameters for the VoIP service with the base station by exchanging the DSA-REQ and the DSA-RSP messages (or DSC-REQ and DSC-RSP messages), wherein the QoS parameters include silence period support parameters (UGIs, SID packet size) illustrated in Table 3 (S501). These QoS parameters can include parameters related to the operation in the unsolicited grant interval such as the PSC in the talk spurt of Table 2. At this time, since UGIs of Table 3 replaces UPI in the silence period, UPI is not required. In a state that both the mobile station and the base station have information of the QoS parameters, the mobile station transmits the VoIP packet during the talk spurt (S520). If the mobile station senses the silence period (S525), the mobile station reports the silence period to the base station (S530). If the base station senses the silence period (S535), the base station allocates resources to the mobile station by using UGIs and SID packet data size QoS parameter information suggested in the present invention known through the initial QoS negotiation procedure (S510) (S540). The mobile station transmits SID packet data through the allocated resources (S550). Hereinafter, the detailed embodiments to which the above procedure is applied will be described.

Embodiment 5

Figure 12:
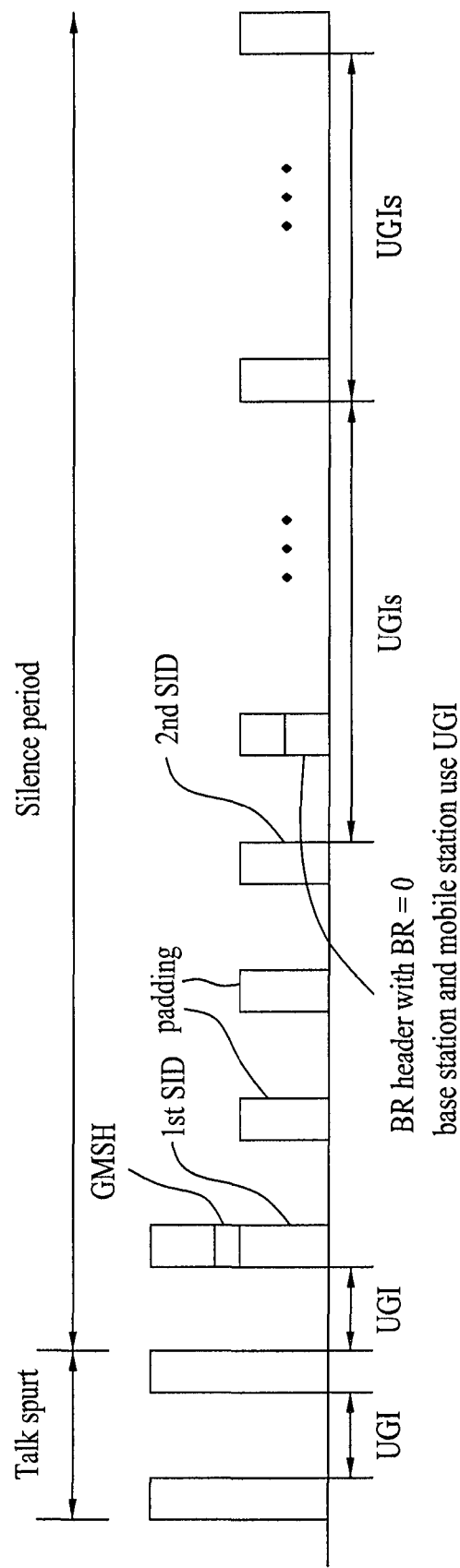
FIG. 12 is a diagram illustrating a scheduling method in a real-time packet service suggested in the embodiment 5 of the present invention.

FIG. 12 is a diagram illustrating a scheduling method in a real-time packet service suggested in the embodiment 5 of the present invention. In the embodiment 5 illustrated in FIG. 12, when the size of the bandwidth requested from the mobile station is set to 0, the base station determines the current state as the silence period and allocates the bandwidth to the mobile station by using UGIs and SID packet data size of Table 3.

In FIG. 12, if a vocoder of an application layer which is an upper layer of the mobile station generates SID packet data during the talk spurt, the mobile station determines the current state as the silence period. The SID packet data means packet data generated by an application layer corresponding to the uppermost layer of OSI (Open System Interconnection) and corresponds to dummy data made by the vocoder, etc. The SID packet data functions as the same manner of the comfort noise described in the embodiment 1 to the embodiment 4. The SID packet may be regarded as actual talk data in the talk spurt in view of the mobile station and the base station. Also, the SID packet may be regarded as dummy data in the silence period in view of the vocoder. Hereinafter, the time when initial SID packet data is transmitted will be regarded as a start time of the silence period. The mobile station transmits the initial SID packet data to the base station through a resource zone allocated to be used when the data packet in the talk spurt is transmitted. At this time, the SID packet data means control information (for example, GMSH in IEEE 802.16m) used by the mobile station to forward bandwidth management request to the base station. The mobile station transmits the control information to the base station, wherein the control information includes size information of the initial SID packet data.

The base station which has received the control information including the initial SID packet data allocates a resource (for example, bandwidth) suitable for the SID packet data size to the data packet transmission interval (UGI) of the talk spurt. If the mobile station which has transmitted the initial SID packet data through this resource allocation has been allocated with resources starting from next UGI but does not have SID packet data to be transmitted through the allocated resource zone, the mobile station transmits a padding packet corresponding to second layer data (MAC data) of OSI through the allocated resource zone until second SID packet data is generated. Since UGI information of Table 2 is also negotiated through the step S510 of the connection procedure of FIG. 11, the mobile station transmits a padding packet at UGI until second SID is transmitted from the initial SID packet data. In other words, the mobile station is operated at the UGI not UGIs from initial SID packet data transmission until there is no data to be transmitted, although it is silence period from the initial SID packet data transmission interval. If second SID packet data is generated, the mobile station transmits the second SID packet data to the resource zone allocated through initial SID packet data transmission. If there is no actual talk data to be transmitted during next transmission interval (i.e., UGI) after transmission of the second SID packet data, the mobile station transmits a bandwidth request header having a bandwidth request (BR) of 0 to the base station. The base station which has received the BR header to which BR=0 is set determines real-time packet service connection such as VoIP as the silence period and allocates resources to the mobile station by using the UGIs and the SID packet data size of Table 3. In other words, the mobile station transmits SID packet data after third SID through the allocated resource zone at the UGIs and the SID packet data size of Table 3.

Embodiment 6

Figure 13:
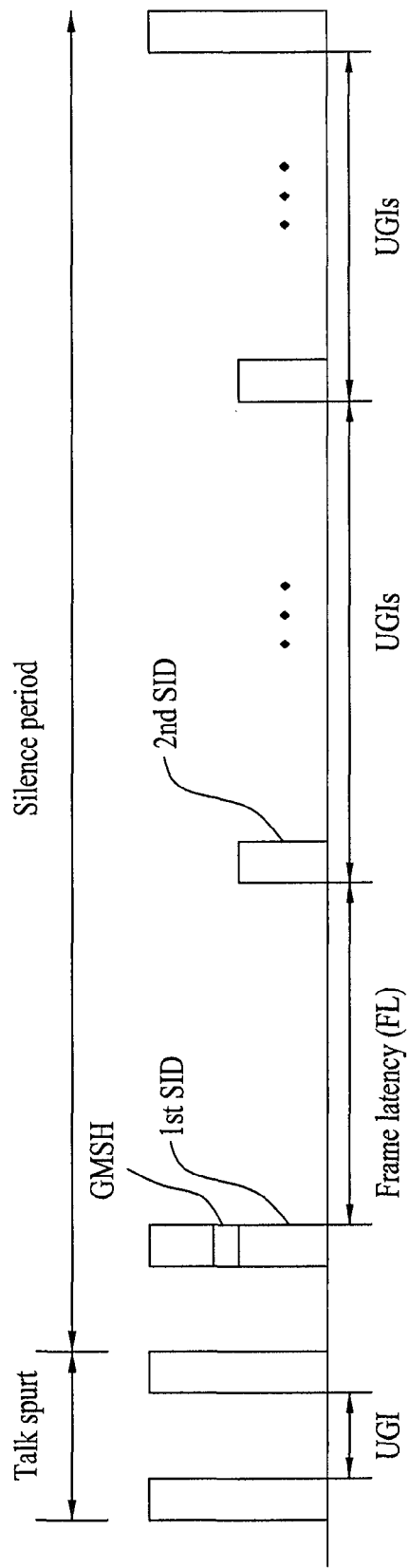
FIG. 13 is a diagram illustrating a scheduling method in a real-time packet service suggested in the embodiment 6 of the present invention.

FIG. 13 is a diagram illustrating a scheduling method in a real-time packet service suggested in the embodiment 6 of the present invention. In the embodiment 6, when a size of a resource such as the bandwidth requested from the mobile station is set to a value smaller than or equal to the SID packet data size, the base station determines the current state as the silence period and allocates the resource such as the bandwidth to the mobile station by using the UGIs and the SID packet data size of Table 3. Its detailed procedure will be described as follows. If the mobile station senses generation of the initial SID packet data from the upper layer such as the application layer during the talk spurt, the mobile station determines entrance to the silence period.

The mobile station transmits the initial SID packet data to the base station by using the QoS parameters, wherein the QoS parameters include the parameters of Table 2 and Table 3, which have been acquired through the resource zone allocated from the base station in the step S510 of FIG. 11. At this time, the initial SID packet data means control information used by the mobile station to forward bandwidth management request to the base station, and includes size information of the initial SID packet data, information (frame latency) indicating the number of previous frames of a current frame that can be used by the transmitted data, and information (frame latency indication: FLI) indicating whether the frame latency can be used. For example, extended piggyback of GMSH in IEEE 802.16m is set to SID packet data size, FLI is set to 1, and frame latency (FL) value is set to the time (for example, FL is set to 3 in AMR) when second SID packet data is transmitted.

The base station which has received the initial SID packet data including the control information determines that the mobile station has entered the silence period, and provides the mobile station with unsolicited grant by using UGIs and SID packet data size. Since the SID packet data size in this embodiment is remarkably smaller than actual service data such as voice packet of real-time packet service such as VoIP, the base station can determine, through the SID packet data size, that the mobile station has entered the silence period.

For example, if FLI of GMSH is set to 1, the mobile station and the base station apply UGIs and SID packet size from the rear of FL. Namely, the mobile station and the base station transmit second SID from the initial SID, to which SID packet data size is applied starting from the rear of FL, and transmit SID packet data at an interval of UGIs from the talk spurt to the time when talk ends.

If the base station is requested resource allocation greater than SID packet data size from the mobile station, the base station determines the current timing as a start timing of the talk spurt and periodically allocates a resource (unsolicited grant) to the mobile station by using parameters (UGI, etc.) for the talk spurt of Table 2. Conversion request from the silence period to the talk spurt is performed by contention based bandwidth request opportunity by mobile station or a resource allocation request through a channel (for example, transmission of CQICH codeword) used when the mobile station periodically transmits control information such as channel quality to the base station regardless of transmission of actual user data.

Embodiment 7

Figure 14:
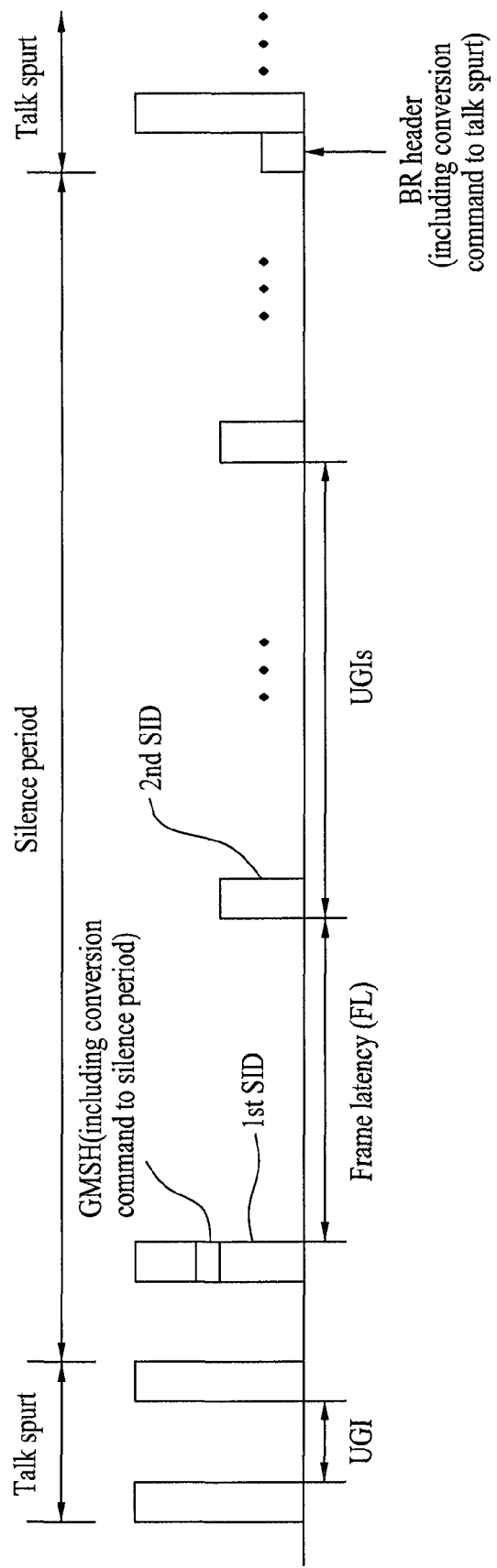
FIG. 14 is a diagram illustrating a scheduling method in a real-time packet service suggested in the embodiment 7 of the present invention.

FIG. 14 is a diagram illustrating a scheduling method in a real-time packet service suggested in the embodiment 7 of the present invention. FIG. 14 illustrates a shift procedure of a base station between the silence period and the talk spurt by using a specified message requesting state shift between the talk spurt and the silence period. In FIG. 14, if the mobile station senses initial SID generation from the upper layer such as the application layer during the talk spurt, the mobile station determines entrance to the silence period.

The mobile station transmits the initial SID packet data to the base station by using the QoS parameters, wherein the QoS parameters include the parameters of Table 2 and Table 3, which have been acquired through the resource zone allocated from the base station in the step S510 of FIG. 11. At this time, the initial SID packet data means control information used by the mobile station to forward bandwidth management request to the base station, and includes size information of the initial SID packet data, information (frame latency) indicating the number of previous frames of a current frame that can be used by the transmitted data, information (frame latency indication: FLI) indicating whether the frame latency can be used, and control information including shift command. For example, extended piggyback of GMSH in IEEE 802.16m is set to SID packet data size, FLI is set to 1, and frame latency (FL) value is set to the time (for example, FL is set to 3 in AMR) when second SID packet data is transmitted. The shift command represents shift from the talk spurt to the silence period or shift from the silence period to the talk spurt. Alternatively, separate shift command can be allocated for each shift.

The base station which has received the initial SID packet data together with the control information including the shift command determines that the mobile station has entered the silence period, and provides the mobile station with unsolicited grant by using UGIs and SID packet data size. In the embodiment 7 unlike the embodiment 6, since the base station may not determine the state with the SID packet size, there is no limitation in the SID packet data size.

For example, if FLI of GMSH is set to 1, the mobile station and the base station apply UGIs and SID packet size to FL starting from the rear of FL. Namely, the mobile station and the base station transmit second SID packet data from initial SID, to which SID packet data size is applied starting from the rear of FL, and transmit SID packet data at an interval of UGIs from the time when the shift command to the talk spurt is received to the time when the talk spurt ends.

Figure 15:
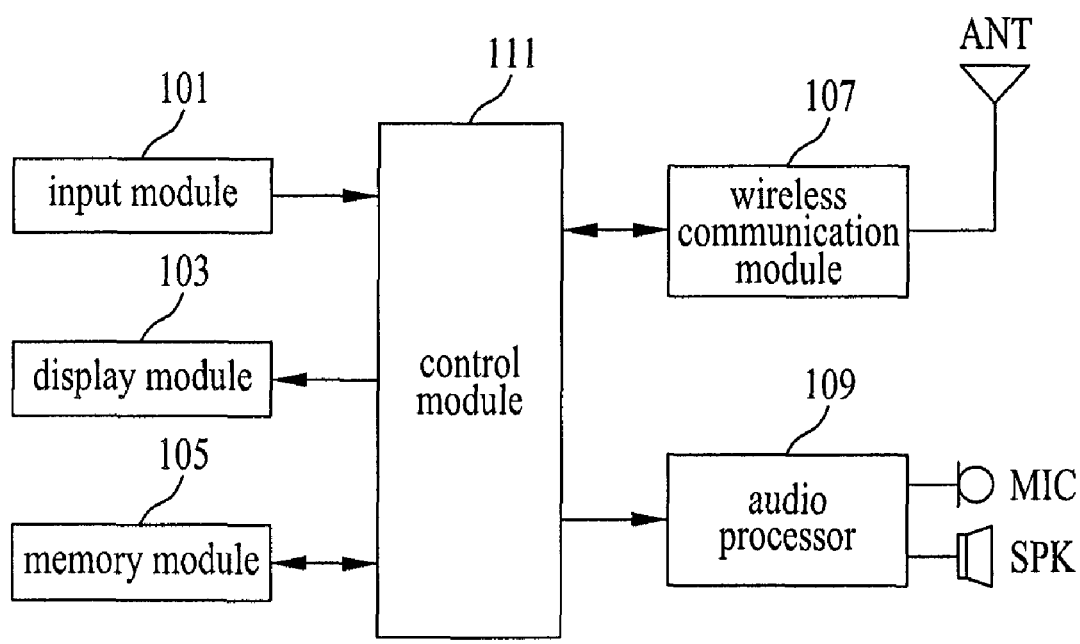
FIG. 15 is a block diagram illustrating a configuration of a mobile station according to the present invention.

Finally, a configuration of the mobile station which supports the emergency communication method according to the present invention will be described. FIG. 15 is a block diagram illustrating the configuration of the mobile station according to the present invention.

The mobile station includes an input module 101 selecting a desired function or inputting information, a display module 103 displaying various kinds of information for operating the mobile station, a memory module 105 storing various programs required to operate the mobile station and data to be transmitted to a receiving side, a wireless communication module 107 receiving an external signal and transmitting data to the receiving side, an audio processor 109 converting a digital audio signal into an analog audio signal, amplifying the converted audio signal, and outputting the amplified signal to a speaker (SP), or amplifying an audio signal from a mike (MIC) and converting the amplified signal into a digital signal, and a control module 111 controlling entire driving of the mobile station.

Particularly, the control module 111 further negotiates the QoS parameters for the VoIP service with the base station, defines the PSC of the talk spurt by using the negotiated QoS parameters, and activates the defined PSC. If conversion from the talk spurt to the silence period is made, the control module 111 redefines the PSC of the silence period by using the negotiated QoS parameters and activates the redefined PSC. If conversion from the silence period to the talk spurt is made, the control module 111 redefines the PSC of the talk spurt by using the negotiated QoS parameters and activates the redefined PSC.

Furthermore, the control module 111 may selectively negotiate the QoS parameters for the VoIP service with the base station, and define first PSC (PSC-1) of the talk spurt and second PSC (PSC-2) for the silence period by using the negotiated QoS parameters. If conversion from the talk spurt to the silence period is made, the control module 111 selects the PSC-1 and activates the selected PSC-1. If conversion from the silence period to the talk spurt is made, the control module 111 selects the PSC-2 and activates the selected PSC-2.

Meanwhile, examples of the mobile station according to the present invention include personal digital assistant (PDA), cellular phone, personal communication service (PCS) phone, global system for mobile (GSM) phone, wideband CDMA (WCDMA) phone, and mobile broadband system (MBS) phone.

INDUSTRIAL APPLICABILITY

According to the present invention, the method of transmitting and receiving data receives control information related to transmission and reception from the transmitting side, determines at least one of power saving parameter information of the talk spurt and the silence period from the control information, and receives data from the transmitting side by applying the power saving parameter information depending on the talk spurt and the silence period, whereby unnecessary data reception is not performed in the silence period.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for transmission or reception of service data in a wireless access system, the method comprising:
transmitting, from a terminal, a Dynamic Service Addition request (DSA-REQ) message in order to negotiate parameters used when scheduling a grant and polling service for transmission or reception of the service data;
receiving a Dynamic Service Addition response (DSA-RSP) message including a primary interval and a secondary interval for the service data; and
transmitting or receiving the service data using the primary interval,
wherein the DSA-RSP message further includes a primary size parameter and a secondary size parameter for the grant and polling service, wherein an interval of the service data used by the grant and polling service is switched between the primary interval and the secondary interval, and wherein a size parameter used by the grant and polling service is switched between the primary size parameter and the secondary size parameter.

2. The method according to claim 1, wherein switching between the primary interval and the secondary interval is performed by transmitting a bandwidth request message from the terminal.

3. The method according to claim 1, wherein switching between the primary interval and the secondary interval is performed when the secondary interval is defined during the parameter negotiation.

4. The method according to claim 1, wherein switching between the primary interval and the secondary interval is performed when a characteristic of the service data is changed.

5. The method according to claim 1, wherein the DSA-RSP message further includes a Maximum Sustain Traffic Rate parameter defining a peak information rate of the service data and a Request/Transmission Policy parameter specifying certain attributes for an associated service flow.

6. A method for transmission or reception of service data in a wireless access system, the method comprising:

receiving, by a base station, a Dynamic Service Addition request (DSA-REQ) message in order to negotiate parameters used when scheduling a grant and polling service for transmission or reception of the service data;

transmitting a Dynamic Service Addition response (DSA-RSP) message including a primary interval and a secondary interval for the service data; and receiving or transmitting the service data using the primary interval, wherein the DSA-RSP message further includes a primary size parameter and a secondary size parameter for the grant and polling service, wherein an interval of the service data used by the grant and polling service is switched between the primary interval and the secondary interval, and wherein a size parameter used by the grant and polling service is switched between the primary size parameter and the secondary size parameter.

7. The method according to claim 6, wherein switching between the primary interval and the secondary interval is initiated by receiving a bandwidth request message.

8. The method according to claim 6, wherein switching between the primary interval and the secondary interval is performed when the secondary interval is defined during the parameter negotiation.

9. The method according to claim 6, wherein switching between the primary interval and the secondary interval is performed when a characteristic of the service data is changed.

10. The method according to claim 6, wherein the DSA-RSP message further includes a Maximum Sustain Traffic Rate parameter defining a peak information rate of the service data and a Request/Transmission Policy parameter specifying certain attributes for an associated service flow.

11. A terminal for transmission or reception of service data in a wireless access system, the terminal comprising:

a control module configured to;

transmit, from a terminal, a Dynamic Service Addition request (DSA-REQ) message in order to negotiate parameters used when scheduling a grant and polling service for transmission or reception of the service data;

receive a Dynamic Service Addition response (DSA-RSP) message including a primary interval and a secondary interval for the service data; and transmit or receive the service data using the primary interval, wherein the DSA-RSP message further includes a primary size parameter and a secondary size parameter for the grant and polling service, wherein an interval of the service data used by the grant and polling service is switched between the primary interval and the secondary interval, and wherein a size parameter used by the grant and polling service is switched between the primary size parameter and the secondary size parameter.

12. The terminal according to claim 11, wherein switching between the primary interval and the secondary interval is performed by transmitting a bandwidth request message from the terminal.

13. The terminal according to claim 11, wherein the switching between the primary interval and the secondary interval is performed when the secondary interval is defined during the parameter negotiation process.

14. The terminal according to claim 11, wherein switching between the primary interval and the secondary interval is performed when a characteristic of the service data is changed.

15. The terminal according to claim 11, wherein the DSA-RSP message further includes a Maximum Sustain Traffic Rate parameter defining a peak information rate of the service data and a Request/Transmission Policy parameter specifying certain attributes for an associated service flow.

* * * * *